United States Patent
McArdle et al.

(10) Patent No.: US 6,442,686 B1
(45) Date of Patent: Aug. 27, 2002

(54) SYSTEM AND METHODOLOGY FOR MESSAGING SERVER-BASED MANAGEMENT AND ENFORCEMENT OF CRYPTO POLICIES

(75) Inventors: Mark James McArdle, San Carlos; Steven Blair Schoenfeld, Santa Clara, both of CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/157,751

(22) Filed: Sep. 21, 1998

Related U.S. Application Data (60) Provisional application No. 60/095,422, filed on Aug. 7, 1998, and provisional application No. 60/091,649, filed on Jul. 2, 1998.

(51) Int. Cl.[7] .................................................. H04L 9/00
(52) U.S. Cl. ...................... 713/151; 713/153; 713/160; 713/162; 713/164
(58) Field of Search ................................ 713/151, 152, 713/153, 160, 162, 164

(56) References Cited

U.S. PATENT DOCUMENTS

| | | | |
|---|---|---|---|
| 4,918,728 A | | 4/1990 | Matyas et al. |
| 5,164,988 A | | 11/1992 | Matyas et al. |
| 5,416,842 A | | 5/1995 | Aziz |
| 5,436,972 A | | 7/1995 | Fischer |
| 5,495,533 A | | 2/1996 | Linehan et al. |
| 5,499,297 A | | 3/1996 | Boebert |
| 5,604,803 A | | 2/1997 | Aziz |
| 5,745,574 A | | 4/1998 | Muftic |
| 5,748,735 A | | 5/1998 | Ganesan |
| 5,751,814 A | | 5/1998 | Kafri |
| 5,761,306 A | | 6/1998 | Lewis |
| 5,799,086 A | | 8/1998 | Sudia |
| 5,835,726 A | * | 11/1998 | Shwed et al. .......... 395/200.59 |
| 5,841,865 A | | 11/1998 | Sudia |
| 5,850,451 A | | 12/1998 | Sudia |
| 5,922,074 A | | 7/1999 | Richard et al. |
| 5,958,050 A | | 9/1999 | Griffin et al. |
| 6,067,620 A | * | 5/2000 | Holden et al. ............... 713/155 |
| 6,073,242 A | * | 6/2000 | Hardy et al. ................. 713/201 |

* cited by examiner

*Primary Examiner*—Albert Decady
*Assistant Examiner*—Paul E. Callahan
(74) *Attorney, Agent, or Firm*—Patrick J. S. Inouye; John A. Smart; Christopher J. Hamaty (57) ABSTRACT

A cryptographic-enabled messaging system providing a "Policy Management Agent" is described. The Policy Management Agent works in conjunction with a standard mail server, such as an SMTP (Simple Mail Transport Protocol) mail server, to ensure that incoming and outgoing e-mail adheres to the policies that are specified for a given site. Specifically, the Agent intercepts e-mail normally bound for the mail server and checks to make sure that it conforms with policies configured for one's site (e.g., corporate site). If the e-mail adheres to the policies for the site, it is forwarded to the mail server where it is routed to the intended recipient. If the e-mail does not adhere to the policies specified for the site, a message of one's choosing is sent to the client indicating that the e-mail was rejected. In an exemplary embodiment (e.g., for SMTP), the Policy Management Agent may be employed to make sure that e-mail has been encrypted using certain designated recovery keys; ensure that all e-mail messages are encrypted before allowing them to be delivered; specify whether e-mail must be signed or not before it is allowed to pass the policy requirement; specify whether conventional encryption is allowed; maintain a log file listing all of the attempts to route e-mail along with a description of the outcome.

40 Claims, 5 Drawing Sheets

SYSTEM AND METHODOLOGY FOR MESSAGING SERVER-BASED MANAGEMENT AND ENFORCEMENT OF CRYPTO POLICIES

RELATED APPLICATIONS

The present application claims the benefit of priority from and is related to the following commonly-owned U.S. provisional application: application Ser. No. 60/095,722, filed Aug. 7, 1998, and entitled SYSTEM AND METHODOLOGY FOR MESSAGING SERVER-BASED MANAGEMENT AND ENFORCEMENT OF CRYPTO POLICIES; and Ser. No. 60/091,649, filed Jul. 2, 1998, and entitled CRYPTOGRAPHIC SYSTEM AND METHODOLOGY FOR CREATING AND MANAGING CRYPTO POLICY ON CERTIFICATE SERVERS. The disclosures of the foregoing applications are hereby incorporated by reference in their entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present application relates generally to cryptographic systems and, more particularly, to methods for messaging server-based management and enforcement of crypto policies.

With each passing day, more and more computers are connected together through pervasive open networks, such as the Internet, Wide Area Networks (WANs), and the like. With the ever-increasing popularity of such environments comes the need for exchanging messages and other documents in a secured fashion over an open communication network. To this end, some sort of cryptographic system is usually employed.

Generally, cryptographic systems use either "secret-key" encryption or "public key" encryption. In "secret-key" encryption, a single key is used for both encryption and decryption. Consider, for example, a user (sender) who wants to send an electronic mail or "e-mail" message to a colleague (recipient) in a secured manner, such that no one who intercepts the message will be able to read it. If the sender employs a cryptographic "secret key" to encrypt the message, the recipient, in turn, must also use the same key to decipher or decrypt the message. As a result, the same key must be initially transmitted via secure channels so that both parties can know it before encrypted messages can be sent over insecure channels. This is typically inconvenient, however. A better approach is, therefore, sought.

Figure 1A:
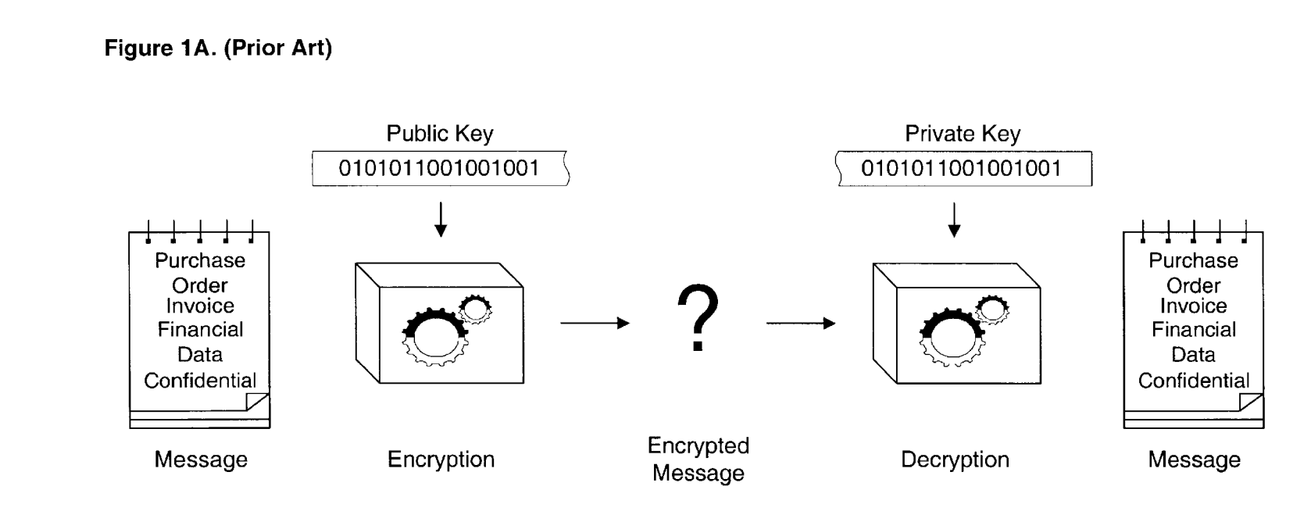
FIG. 1A is a block diagram illustrating general public key cryptography technique.

Public key cryptography overcomes the problem by eliminating the need for a single "secret" key. As illustrated in FIG. 1A, each user of a public key cryptographic system has two mathematically-related keys, a "public key" and a secret or "private key." Operating in a complementary fashion, each key in the pair unlocks the code that the other key makes. Knowing the public key does not help deduce the corresponding private key, however. Accordingly, the public key can be published and widely disseminated across a communications network, such as the Internet, without in any way compromising the integrity of the private key. Anyone can use a recipient's public key to encrypt a message to that person, with the recipient, in turn, using his or her own corresponding private key to decrypt the message. One's private key, on the other hand, is kept secret, known only to the user.

Keys are typically stored on "keyrings." Public keys, including a user's own as well as those of colleagues', are stored in a "public keyring" file. A user's private key is, in a similar fashion, stored in a "private keyring" file. Each key pair has a User ID (such as the owner's name and e-mail address) so that the user and the user's colleagues can identify the owners of keys. Each private key also has a passphrase, or verbose password, that protects it. No one but a message's intended recipient can decrypt the message, not even the person who originally encrypted the message, because no one else has access to the private key necessary for decrypting the encrypted message.

Since public key cryptography provides privacy without the need for the same kind of secure channels that conventional secret key encryption requires, it is commonly employed to send secured messages and other documents from one individual to another across a network or other communication channel, including the Internet. An example of its use in a commercial product today includes PGP™, available from Pretty Good Privacy, Inc. of Santa Clara. Calif.

Keys are also used to digitally sign a message or file and, in a complementary manner, to verify a digital signature. These "digital signatures" allow authentication of messages. When a user signs a message, a cryptographic program uses that user's own private key to create a digital signature that is unique to both the contents of the message and the user's private key. Any recipient can employ the user's public key to authenticate the signature. Since the signer, alone, possesses the private key that created that signature, authentication of a signature confirms that the message was actually sent by the signer, and that the message has not been subsequently altered by anyone else. Forgery of a signed message is computationally infeasible.

Figure 1B:
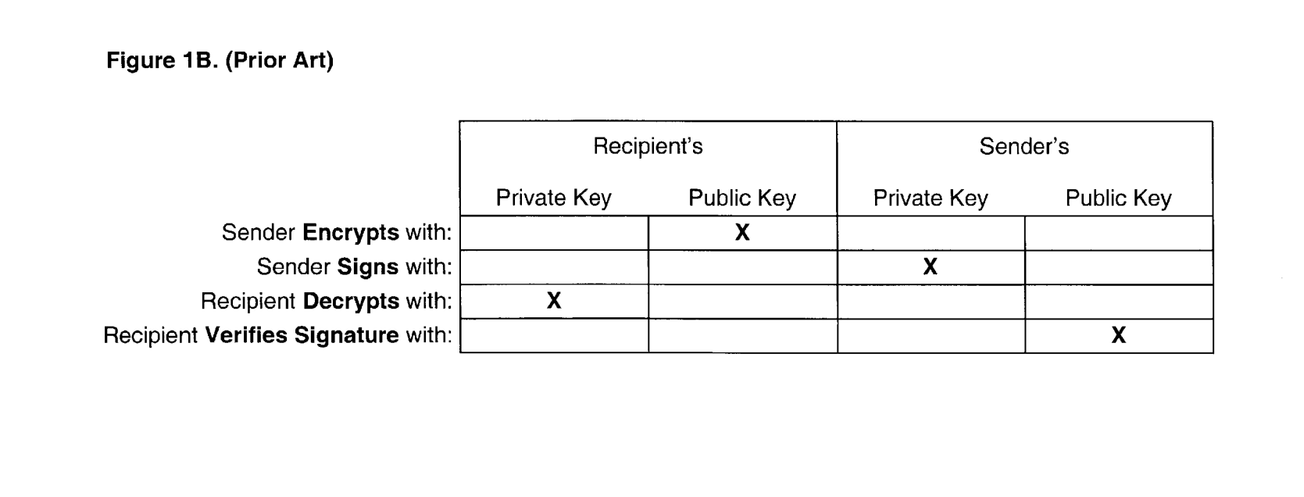
FIG. 1B is a table summarizing use of keys when sending and receiving messages.

By way of summary, FIG. 1B illustrates the functions for which public and private keys are used when sending and receiving messages. When keys are used to secure files stored on a user's own computer or local network server, the user is both the "sender" (the person who saves the file) and the "recipient" (the person who opens the file).

Cryptographic systems, including ones implementing public key cryptography, are described in the technical, trade, and patent literature. For a general description, see e.g., Schneier, Bruce, *Applied Cryptography*, Second Edition, John Wiley & Sons, Inc., 1996. For a description focusing on the PGP™ implementation of public key cryptography, see e.g., Garfinkel, Simon, *PGP: Pretty Good Privacy*, O'Reilly & Associates, Inc., 1995. The disclosures of each of the foregoing are hereby incorporated by reference.

The deployment of strong cryptography within an organization forces some important business policy issues to be managed. As with all strong crypto, the key(s) to which the data is encrypted must be available or else the data is totally unrecoverable. Most organizations find this risk unacceptable. For instance, a company might be (legally) required to be able to provide copies of e-mail that originated within its network. Accordingly, most organizations take steps to ensure that any corporate information is always recoverable by the company.

One way to accomplish this is to escrow all of the encryption keys within an organization. This solution has its own disadvantages and policy concerns attendant with other key escrow approaches. Another method is to employ a "message recover agent" that is designed to encrypt data to a designated recipient (i.e., the user's company). Encryption client software (e.g., PGP) can readily be configured to support this recovery mechanism. However, it is possible for users to make mistakes, innocent and otherwise. A user's act of downloading the freeware PGP client and running it on a corporate desktop would undermine the corporate policy, for instance. Enforcement of recovery policies at the client is awkward at best. Hence, a better approach is sought.

Since encrypting e-mail is the most common reason for organizations to deploy strong crypto, the messaging gateways are the most secure point to enforce a corporation's crypto policy. It is reasonable to place the enforcement mechanism at such a point, therefore. What is needed is a system providing management and enforcement methodologies that afford system administrators secure and control access to the various servers throughout one's organization. The present invention fulfills this and other needs.

SUMMARY OF THE INVENTION

The present invention comprises a system providing a "Policy Management Agent" which works in conjunction with a standard mail server, such as an SMTP (Simple Mail Transport Protocol) mail server, to ensure that outgoing (and, optionally, incoming) e-mail adheres to the policies that are specified for a given site. The Agent intercepts e-mail normally bound for the mail server and checks to make sure that it conforms with policies configured for one's site (e.g., corporate site). If the e-mail adheres to the policies for the site, it is forwarded to the mail server where it is routed to the intended recipient. If the e-mail does not adhere to the policies specified for the site, a message of one's choosing is sent to the client indicating that the e-mail was rejected.

In an exemplary embodiment, the Policy Management Agent for SMTP provides the following features:

(1) Makes sure that e-mail has been encrypted using certain designated recovery keys. Only those messages which have been encrypted to the required keys are allowed to pass through the gateway.

(2) Ensures that all e-mail messages are encrypted before allowing them to be delivered. One can also specify that e-mail should not be encrypted from certain sites.

(3) Specifies whether e-mail must be signed or not before it is allowed to pass the policy requirement. The Agent can also reject e-mail that has been encrypted using certain keys which are designated as forbidden.

(4) Specifies whether conventional encryption is allowed.

(5) Maintains a log file listing all of the attempts to route e-mail along with a description of the outcome.

In operation, the system initializes a global configuration state. This step is followed by initialization of the proxy subsystem (i.e., Agent). Now the Agent can monitor e-mail: the Agent waits for a client connection. Specifically, the Agent waits to "capture" a message body. The particular message body is employed to invoke PGP runtime calls from the PGPsdk cryptosystem runtime engine (available from Network Associates, Inc.). The PGP runtime engine builds a status list for the message, including information about:

(1) encryption recipient count (encryptionrecipientcount)

(2) list of encryption keyids (i.e., key IDs)

(3) conventional encryption recipient count (conventionalencryptionrecipientcount)

(4) number of signed sections

Based on the foregoing information, the Policy Management Agent may enforce specified crypto policies on the message. In an exemplary embodiment, policies or rules include:

(1) message must/must not/may be encrypted (2) message must/must not/may be signed (mutually exclusive with previous)

(3) if encrypted, message must be encrypted to one of the following sets of keys (4) if encrypted, message must not be encrypted to any of the following keys (5) if encrypted, convention encryption may/may not be used The policies can be applied to certain groups/entities based on their network location (i.e. Internet Protocol or IP address).

If a policy violation occurs, the event is logged in a logfile, and the message is not forwarded to the "real" messaging gateway. A configurable message, which informs the user why his message was rejected, is returned to the user. Thereafter, the system may perform cleanup and await another client connection.

GLOSSARY

The following definitions are offered for purposes of illustration, not limitation.

Authentication: The determination of the origin of encrypted information through the verification of someone's digital signature or someone's public key by checking its unique fingerprint.

Certify: To sign another person's public key.

Certifying Authority: One or more trusted individuals are assigned the responsibility of certifying the origin of keys and adding them to a common database.

Decryption: A method of unscrambling encrypted information so that it becomes legible again. The recipient's private key is used for decryption.

Digital Signature: See signature.

Encryption: A method of scrambling information to render it unreadable to anyone except the intended recipient, who must decrypt it to read it.

Key: A digital code used to encrypt, sign, decrypt and verify e-mail messages and files. Keys come in key pairs and are stored on keyrings.

Key Escrow: A practice where a user of a public key encryption system surrenders their private key to a third party thus permitting them to monitor encrypted communications.

Key Fingerprint: A uniquely identifying string of numbers and characters used to authenticate public keys. For example, one can telephone the owner of a public key and have him or her read the fingerprint associated with their key so one can compare it with the fingerprint on one's copy of their public key to see if they match. If the fingerprint does not match, then one knows one has a bogus key.

Key ID: A legible code that uniquely identifies a key pair. Two key pairs may have the same User ID, but they will have different Key IDs.

Key Pair: A public key and its complimentary private key. In public-key cryptosystems, like the PGP program, each user has at least one key pair.

Keyring: A set of keys. Each user has two types of keyrings: a private keyring and a public keyring.

Message Digest: A compact "distillate" of one's message or file checksum. It represents one's message, such that if the message were altered in any way, a different message digest would be computed from it.

Passphrase: A series of keystrokes that allow exclusive access to one's private key which one uses to sign and decrypt e-mail messages and file attachments.

Plaintext: Normal, legible, unencrypted, unsigned text.

Private Key: The secret portion of a key pair used to sign and decrypt information. A user's private key should be kept secret, known only to the user.

Private Keyring: A set of one or more private keys, all of which belong to the owner of the private keyring.

Public Key: One of two keys in a key pair used to encrypt information and verify signatures. A user's public key can be widely disseminated to colleagues or strangers. Knowing a person's public key does not help anyone discover the corresponding private key.

Public Keyring: A set of public keys. One's public keyring includes one's own public key(s).

Public-Key Cryptography. Cryptography in which a public and private key pair is used, and no security is needed in the channel itself.

Sign: To apply a signature.

Signature: A digital code created with a private key. Signatures allow authentication of information by the process of signature verification. When one signs a message or file, the PGP program uses one's private key to create a digital code that is unique to both the contents of the message and one's private key. Anyone can use one's public key to verify one's signature.

SMTP: Simple Mail Transport Protocol—a popular e-mail protocol, which is described, for instance, in RFC 821.

Text: Standard, printable, 7-bit ASCII text.

Trusted: A public key is said to be trusted by the user if it has been certified by the user or by someone the user has designated as an introducer.

User ID: A text phrase that identifies a key pair. For example, one common format for a User ID is the owner's name and e-mail address. The User ID helps users (both the owner and colleagues) identify the owner of the key pair.

Verification: The act of comparing a signature created with a private key to its public key. Verification proves that the information was actually sent by the signer, and that the message has not been subsequently altered by anyone else.

DETAILED DESCRIPTION OF A PREFERRED EMBODIMENT

The following description will focus on the presently-preferred embodiment of the present invention, which is typically operative in an environment providing application software running under Microsoft® Windows, Apple Macintosh, or Sun Solaris® operating systems. The present invention, however, is not limited to any particular one application or any particular environment. Instead, those skilled in the art will find that the system and methods of the present invention may be advantageously applied to a variety of system and applications. Moreover, the present invention may be embodied on a variety of different platforms, including UNIX, Linux, NextStep, and the like. Therefore, the description of the exemplary embodiments that follows is for purposes of illustration and not limitation.

Messaging Server-based Management and Enforcement of Crypto Policies

A. Overview

The present invention comprises a system providing a "Policy Management Agent" which works in conjunction with a standard mail server, such as an SMTP (Simple Mail Transport Protocol) mail server, to ensure that outgoing (and, optionally, incoming) e-mail adheres to the policies that are specified for a given site. The Agent intercepts e-mail normally bound for the mail server and checks to make sure that it conforms with policies configured for one's site (e.g., corporate site). If the e-mail adheres to the policies for the site, it is forwarded to the mail server where it is routed to the intended recipient. If the e-mail does not adhere to the policies specified for the site, a message of one's choosing is sent to the client indicating that the e-mail was rejected.

In an exemplary embodiment (e.g., for SMTP), the Policy Management Agent provides the following features:

(1) Makes sure that e-mail has been encrypted using certain designated recovery keys. Only those messages which have been encrypted to the required keys are allowed to pass through the gateway.

(2) Ensures that all e-mail messages are encrypted before allowing them to be delivered. One can also specify that e-mail should not be encrypted from certain sites.

(3) Specifies whether e-mail must be signed or not before it is allowed to pass the policy requirement. The Agent can also reject e-mail that has been encrypted using certain keys which are designated as forbidden.

(4) Specifies whether conventional encryption is allowed.

(5) Maintains a log file listing all of the attempts to route e-mail along with a description of the outcome.

Since the system operates in a transparent manner, the system appears, from the perspective of a user, as a messaging server (e.g., SMTP server). In actuality, however, the system functions as a proxy, sitting between the messaging server and the end user. In this manner, when the user sends a message to another user, the server of the present invention can intercept the message and process it before it is actually posted to the real messaging server.

The Policy Management Agent embodiment for SMTP serves as a proxy mail server that monitors the port normally assigned to the SMTP mail server. When a mail client generates a "User Agent" (UA) request, the Agent creates a new socket and connects to the SMTP server. It then allows the transaction to proceed until it encounters an SMTP "DATA" command indicating that the client is about to send the data portion of the e-mail message. The Policy Agent evaluates this information to determine if it contains encrypted data then, based on the policy established in a configuration file, decides whether to send the mail onto the SMTP server or to reject it and close the connection. When e-mail is rejected for a policy violation, a message (specified in the configuration file) is output to the client.

In order to begin using the Policy Management Agent, the user redirects e-mail from the standard server and supplies configuration details. The following configuration settings and their values are exemplary.

smtphost <IP address> or <server name>

Specifies the host name of the SMTP mail server currently installed at one's site.

smtpport <port number> or <service name>

Specifies the number of the port where the SMTP mail server should listen for mail requests generated by the Policy Management Agent for SMTP. If one is running the Policy Management Agent on the same machine as the SMTP server, then an alternate port other than port 25 should be specified.

agentport <sport number>

Specifies the port where the Policy Management Agent will listen for User Agent (UA) mail requests. This is the port originally monitored by the SMTP server (generally, port number 25).

checkhost <IP address> or <host name>

Allows the user (system administrator) to limit the policy checking to the mail traffic coming across a particular subnet by using wildcards. For example, 201.010.* or *.pgp.com would only act on the specified subnet. This setting is useful when one does not want to monitor the whole address space. One can list multiple IP addresses on the same line, where each is separated by a space, or one can enter a separate "checkhost" for each of the addresses.

syslog true | false

Specifies that logging information should be sent to the system log file when this setting is set to true. Otherwise, the output is sent to the standard error device (stderr) or a specified log file. The default value for this setting is false.

logging none | error | warning | info | verbose

Specifies the level of information that is recorded in the log file. One can view the contents of this file to determine what e-mail requests have been processed by the Agent and how they were resolved. Options for this setting include the following:

none No logging is performed. This is the default value.
   error Logs all error messages.
   warning Logs all errors and warning messages.
   info Logs all errors, warnings and informational messages.
   verbose Logs all messages.

logfile <filename>

Specifies the name and location of the log file used to record the activity processed by the Agent. By default, the file is stored in the following location:

/var/adm/messages mustencrypt true | false

Indicates whether all e-mail must be encrypted before being allowed to pass through the mail server. A value of true specifies that all e-mail messages and file attachments must be encrypted, whereas a value of false specifies that messages do not need to be encrypted. By default, this option is set to false. The "recoverykeys" setting, described next, lists all of the keys for which e-mail must be encrypted.

recoverykey <list>

Specifies the 64-bit key IDs for all of the entities who must be encrypted in order for e-mail to be considered deliverable. Placing all of the key IDs (e.g., separated by a blank space) on a single line indicates that the e-mail must be encrypted to all those keys. If one wants to specify that all e-mail must be encrypted by at least one or another key, then each key ID should be listed on a separate line.

forbidkeys <list>

Specifies the key IDs for those keys that are not allowed to be used for encryption purposes.

signatures allow | disallow require

Specifies whether e-mail should be signed or not. The default value for this setting is "allow".

conventionalencrypt allow | disallow

Specifies whether e-mail that uses "conventional encryption" is allowed to pass through the server. Conventional encryption uses a single cipher that requires a single key to be decrypted. This is in contrast to e-mail that has been encrypted using "public key encryption" which is encrypted with a public key and decrypted with a private key. The default values is "allow".

recovererror <error message>

Specifies the error message that is sent to the client when an e-mail message is not encrypted using a required key specified with the "encryptkeys" setting. In order to make the message readable, it should be spread out over several lines as in the following example:

recovererror 550 You have violated corporate policy with this message recovererror 550 You must encrypt this message to the required key. recovererror 550 Do it again, and severe punishment may be forthcoming!

Notice that the standard SMTP 550—parameter is used to indicate that another line is to follow and no dash is used on the final line.

forbiderror <error message>

Specifies the error message that is sent to the client when an e-mail message has been encrypted using a forbidden key. Forbidden keys are defined with the "forbidkey" setting. In order to make the message readable, it should be spread out over several lines as in the previous example.

signatureerror <error message>

Specifies the error message that is sent to the client when a signature policy violation occurs. In order to make the message readable, it should be spread out over several lines as in the previous example.

encrypterror <error message>

Specifies the error message that is sent to the client when a clear text message is encountered and encryption is required. One may specify that encryption is required through the "mustencrypt" setting. In order to make the message readable, it should be spread out over several lines as in the previous example.

conventionalencrypterror <error message>

Specifies the error message that is sent to the client when an attempt is made to send conventionally encrypted email when this practice is disallowed by the "conventionalencrypt" setting. In order to make the message readable, it should be spread out over several lines as in the previous example.

In operation, the Agent can process the message according to SMTP protocol, trapping the actual message body. Once the actual message has been trapped, the Agent can perform a detailed examination of the message's encryption characteristics, including determining whether the message is encrypted (and to whom), whether it is digitally signed, and the like. Once the Agent has determined the actual composition of the message and all encryption characteristics of interest, the Agent can apply a set of policy rules which are configurable by the (system administrator) user, as per the above configuration settings. The output from this analysis must conform to the rules in order for the message to be posted to the actual messaging server.

In the event that the message is non-conforming, the Agent rejects the message and generates an error dialogue informing the initiator of the message why his or her message is being rejected. For example, a message might be rejected because it was not encrypted (when corporate policy required such a message to be encrypted), it was encrypted to the wrong recipient, it was not encrypted to a mandatory recipient (e.g., the user's manager), or the message was not digitally signed by the user. If, on the other hand, the message conforms to the policy rules, the message is passed on to the real messaging server, for normal processing as an outbound e-mail message.

In the currently-preferred embodiment, the policy rules are applied to outbound messages. If desired, however, the rules may also be applied to inbound messages as well, such as all messages sent to or received from a particular host that needed to be encrypted. In such a case, however, the system is a fairly closed or restrictive system.

Accordingly, most corporate sites would typically prefer a balanced system that applies policy rules to outbound messages.

B. Hardware suitable for implementation

Figure 2:
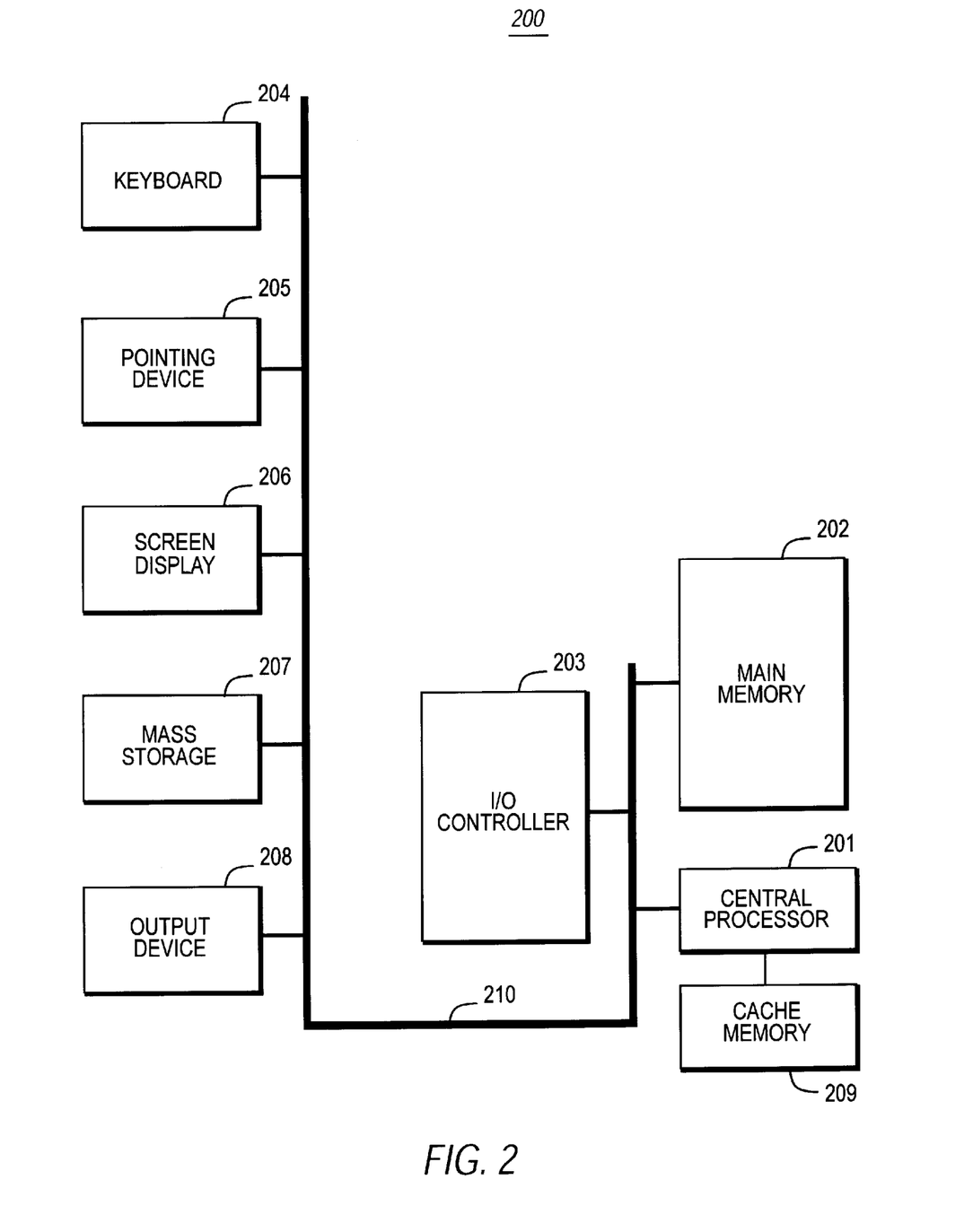
FIG. 2 is a block diagram illustrating a computer system in which the present invention may be embodied.

The present invention may be embodied on one or more computer systems, such as the system 200 of FIG. 2, which comprises a central processor 201, a main memory 202, an input/output controller 203, a keyboard 204, a pointing device 205 (e.g., mouse, track ball, pen device, or the like), a display or screen device 206, and a mass storage 207 (e.g., hard or fixed disk, removable floppy disk, optical disk, magneto-optical disk, or flash memory). Although not shown separately, a real-time system clock is included with the system 200, in a conventional manner. Processor 201 includes or is coupled to a cache memory 209 for storing frequently-accessed information; memory 209 may be an on-chip cache and/or external cache (as shown). A variety of other input/output device(s) 208, such as a modem, a scanner, a printer, a network card, or the like, may be included in the system 200 in a conventional manner, as desired. As shown, the various components of the system 200 communicate through a system bus 210 or similar architecture. In a preferred embodiment, the system 200 includes an IBM PC-compatible personal computer, available from a variety of vendors (including IBM Corp. of Armonk, N.Y.). Typically, one such computer system is employed as a client machine (e.g., employee's desktop computer running Microsoft® Windows 9x, available from Microsoft Corporation of Redmond, Wash.) connected across a network (e.g., 10/100 Base T/Ethernet network, available from 3Com of Santa Clara, Calif.) to a server computer (e.g., corporate server computer running Microsoft® Windows NT, also available from Microsoft Corporation).

C. Software architecture

Figure 3:
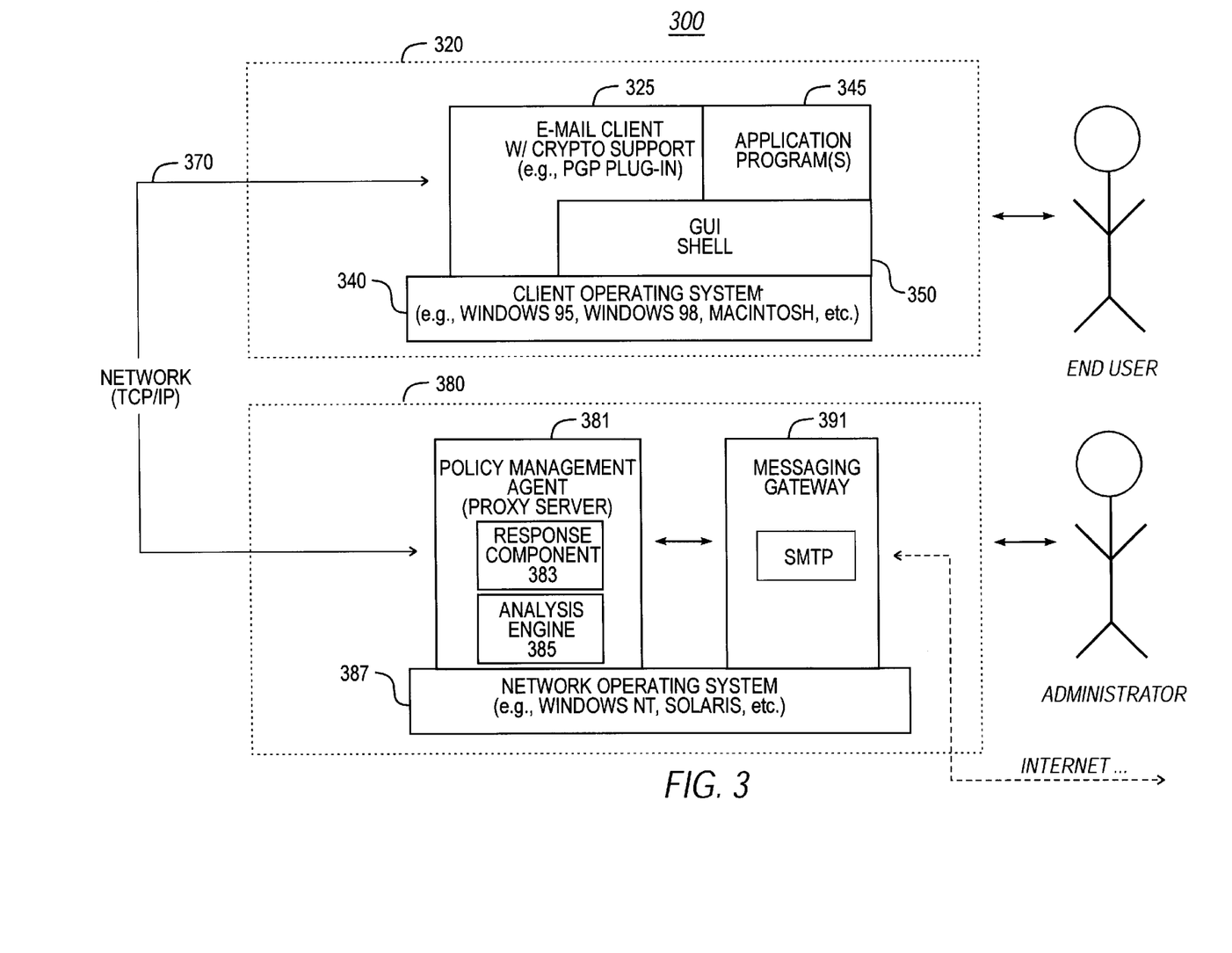
FIG. 3 is a block diagram of a messaging system 300 providing a Policy Management Agent of the present invention.

Illustrated in FIG. 3, a cryptographic-enabled messaging system 300 constructed in accordance with the present invention comprises at least one client 320 running at a workstation, terminal, desktop PC (e.g., system 200), or the like, which is connected over a network 370 (e.g., 10/100 Base T/Ethernet) to back-end server software 380 running on a server computer. The client computer software 320, which is stored in system memory 202 and on persistent storage (e.g., disk memory) 207, includes a kernel or operating system (OS) 340. OS 340 is typically a client OS provided, for example, by Microsoft® Windows 95 or 98, or by Microsoft® Windows NT (Workstation Edition), which are available from Microsoft Corporation of Redmond, Wash. Alternatively, the OS 340 can be provided by IBM OS/2 (available from IBM Corp. of Armonk, N.Y.) or Macintosh OS (available from Apple Computers of Cupertino, Calif.).

In operation, one or more application programs, such as client application software or "programs" 345 are "loaded" (i.e., transferred from storage 207 into memory 202) for execution by the system 200. The operating system provides a windowing GUI (graphical user interface) shell 350, for receiving user commands and data. These inputs, in turn, may be acted upon by the system in accordance with instructions from operating system (OS) module 340, GUI shell 350, and/or application module(s) 345. The GUI also serves to display the results of operation from the OS 340, windows shell 350, and application(s) 345, whereupon the user may supply additional inputs or terminate the session. The GUI is typically provided by interaction of the application modules with the windows shell, both operating under OS 340.

As shown, the system 300 includes an e-mail client 325 having cryptographic capability. An exemplary e-mail client may comprise, for instance, Microsoft® Outlook e-mail client (available from Microsoft Corp. of Redmond, Wash.) with PGP™ integration (e.g., standalone PGP™ or PGP™ plug-in for Microsoft® Outlook, available from Pretty Good Privacy, Inc./Network Associates, Inc. of Santa Clara, Calif.), for providing a cryptosystem at the client. This client cryptosystem, which is implemented in the commercial embodiment of PGP for Personal Privacy, Version 5.5 for Windows 95/NT (available from Pretty Good Privacy, Inc. of Santa Clara, Calif., at http://www.pgp.com), provides encryption of messages (e.g., e-mail, binary files, text (ASCII) files, or the like) for supporting secured communication between a sender and a recipient. For a general description of the system, see PGP for Personal Privacy, Version 5.5 for Windows 95/Windows NT: User's Guide (available for Pretty Good Privacy, Inc.). Additionally, the PGP 5.5 User's Manual is currently available on the Internet via FTP (File Transfer Protocol) at ftp://ftp.no.pgpi.com/pub/pgp/5.5/win95nt/PGP55win.pdf. The disclosure of the foregoing is hereby incorporated by reference. For further description, see commonly-owned application Ser. No. 09/090,771, filed Jun. 4, 1998, entitled CRYPTOGRAPHIC SYSTEM WITH METHODS FOR USER-CONTROLLED KEY RECOVERY, by inventor Philip Zimmermann, the entire disclosure of which is hereby incorporated by reference.

Figure 4:
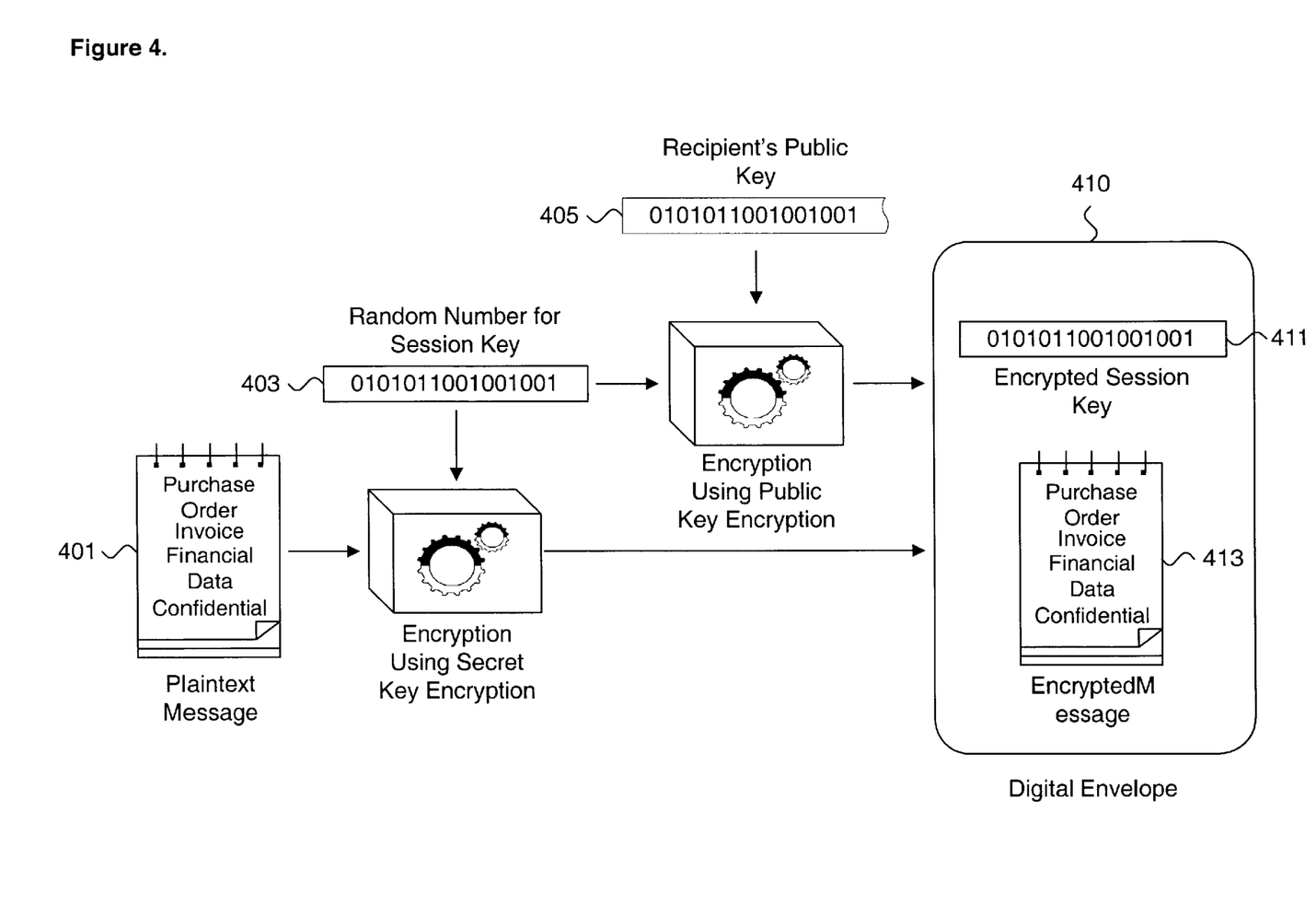
FIG. 4 is a block diagram illustrating basic encryption/decryption methodology employed by the system of FIG. 3.

It is helpful to review the basic encryption/decryption methodology of the client cryptosystem. Because the public key encryption process is much slower than conventional single-key encryption, the client cryptosystem combines elements of secret key (symmetric) cryptography with that of public key (symmetric) cryptography. FIG. 4 illustrates the basic approach. A high-quality, fast, conventional secret-key encryption algorithm is used to encipher the original unenciphered message or "plaintext" 401. The actual "bulk" enciphering mechanism employed can be any symmetric algorithm, including for instance, CAST (Carlisle Adams and Stafford Tavares), IDEA (International Data Encryption Algorithm), Blowfish, DES, or DES variants (e.g., such as triple-DES)), DES with Independent Subkeys, DESX, CRYPT(3), Generalized DES, DES with Alternate S-Boxes, RDES, S" DES, and DES with Key-Dependent S-Boxes). See e.g., Bruce Schneier, *The IDEA Encryption Algorithm*, Dr. Dobb's Journal, December 1993; Bruce Schneier, *The Blowfish Encryption Algorithm*, Dr. Dobb's Journal, April 1994, pp. 38–40; and *Data Encryption Standard* (DES), as published by the National Bureau of Standards, Department of Commerce, FIPS, pub 46, January 1977, pp. 653–670. For a description of DES variants, see e.g., the abovementioned *Applied Cryptography* by Bruce Schneier. The disclosures of each of the foregoing are hereby incorporated by reference. The cryptosystem should generally employ an enciphering mechanism stronger than DES, such as CAST or IDEA.

As part of the foregoing process and in a manner transparent to the user, the client cryptosystem generates a temporary random key or "session key" 403 in FIG. 4—a key which is valid for the then-current session. In particular, the session key is used for enciphering the plaintext file, for creating an encrypted message or "ciphertext" 413. Then the recipient's public key, shown as key 405, is used to encipher this temporary random conventional key, for creating an encrypted session key 411. The public-key enciphered session key 403 together with the enciphered text 413 form a digital envelope 410 that is sent to the recipient. To open the envelope and retrieve its message, the recipient must furnish his or her private key. The recipient does this by selecting his or her private key from a secured keyring, one which is itself protected by a passphrase. A corresponding installation of the cryptosystem at the recipient's site uses the private key to decrypt the encrypted session key. Once decrypted, the session key is used to decrypt the ciphertext, thus regenerating the original message for the recipient. Again, use of a session key at the recipient end is transparent to the recipient user.

Referring back to FIG. 3, the back-end server software 380 includes a Policy Management Agent (server) 381 and a messaging gateway 391, running on a network operating system 387 (e.g., Microsoft® Windows NT). Typically, these are under the control of a system administrator. The Policy Management Agent 381 serves as middleware or a "proxy" server, in effect sitting between the e-mail client 325 and the messaging gateway 391.

The messaging gateway 391 itself simply is the mail server which services the e-mail client. In an exemplary embodiment, the messaging gateway 391 comprises an SMTP server. Both the SMTP protocol and Internet Mail are well documented in the technical and trade literature, see e.g., RFC 821 appended as Appendix A to the abovementioned provisional application 60/095,722 (the disclosure of which has been incorporated by reference), RFC 822 appended as Appendix B to the abovementioned provisional application 60/095,722 (the disclosure of which has been incorporated by reference). The present invention is, however, protocol independent; thus, the messaging gateway to 391 may be constructed to support other messaging protocols, such as Microsoft® Exchange, Lotus® Notes, or other mail transport protocol.

As previously described, the Policy Management Agent 381 controls all communication between the e-mail client 325 and the messaging gateway 391. To achieve this, the messaging gateway should only accept connections from the Policy Management Agent 381 (e.g., determined by examining the IP address of the incoming connection). Only conforming messages, as determined by the Policy Management Agent 381, will reach the messaging gateway 391. Although the control may be imposed bi-directionally, the currently-preferred embodiment adopts the less restrictive approach of applying controls only to outbound messages.

Use of the system is as follows. At the e-mail client, an end user creates an e-mail message and encrypts it (e.g., using the PGP component present at the client machine). When the user has finished creating the encrypted message, he or she instructs the e-mail client software to "send" the message to the intended recipient. In response to this request, the e-mail client software attempts to connect to the messaging gateway, for transporting the e-mail message. The system is configured, however, so that the e-mail client communicates with the Policy Management Agent (i.e., proxy server) instead. Specifically at this point, therefore, the Policy Management Agent traps the outbound message and processes it according to crypto policy rules which have been established for the system (e.g., corporate site). If the message conforms to the rules, the message may then be passed on to the messaging gateway, for transport to the intended recipient. On the other hand, if the message is non-conforming, the message is rejected so that it is not passed on to the messaging gateway. If desired, the system may generate user feedback (e.g., error message) and/or an error log (e.g. for use by a system administrator).

As also shown in FIG. 3, the Policy Management Agent 381 includes a Response Component or Engine 383 and an Analysis Engine 385. Each time a new message is received, the Response Component 383 performs parsing and decomposition of the message, for extracting the message body and important information about the message. The Analysis Engine 385 performs the actual processing of the body of the user message which has been extracted. For the task of processing messages, the Analysis Engine receives a global policy structure. Based on this, the Analysis Engine applies the policy rules and outputs a result. Based on the result returned from the Analysis Engine 385, the Response Component 383 either accepts the message for transport (i.e., conforming to the rules) or rejects/blocks it from transport (i.e., non-conforming to the rules). These operations will now be described in further detail.

D. Internal operation

Figure 5:
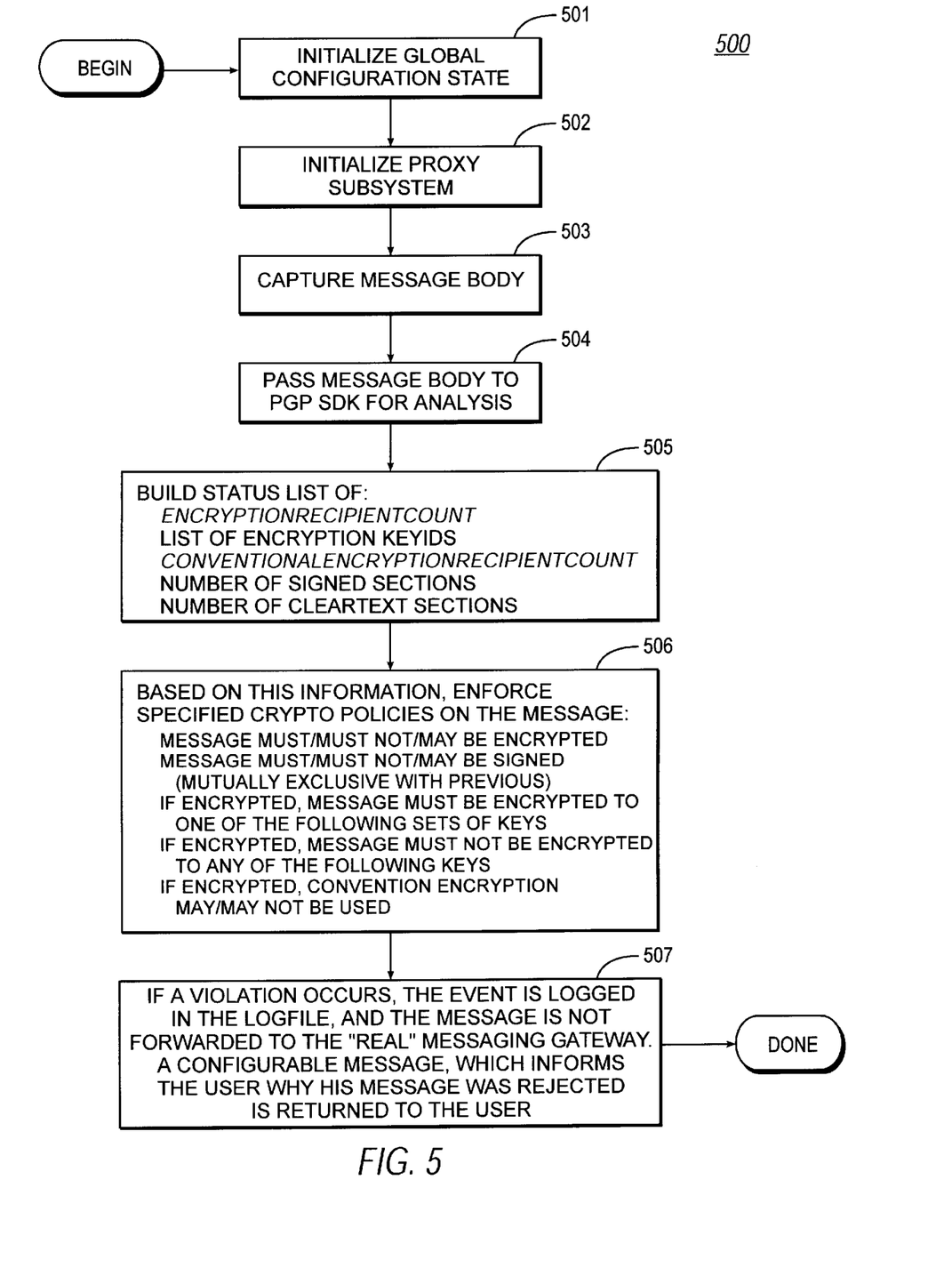
FIG. 5 is a flow chart illustrating the detailed internal operation of the Policy Management Agent, operating in conjunction with other components of the system.

FIG. 5 is a flow chart illustrating the detailed internal operation of the Policy Management Agent, operating in conjunction with other components of the system. At the outset, the global configuration state is initialized, as indicated by step 501. This step is followed by initialization of the proxy subsystem (i.e., Agent), as shown at step 502. Now the Agent can monitor e-mail: the Agent waits for a client connection.

Step 503 indicates that the Agent has received or "captured" a message body. The particular message body is employed to invoke PGP runtime calls from the PGPsdk cryptosystem (available from Network Associates, Inc.). Further description of PGPsdk is available from Inside the PGPsdk, version 1.1, Oct. 30, 1997, available from Network Associates, Inc., the entire disclosure of which is hereby incorporated by reference.

The PGP runtime engine builds a status list for the message (step 505), including information about:

(1) encryption recipient count (encryptionrecipientcount)
(2) list of encryption keyids (i.e., key IDs)
(3) conventional encryption recipient count (conventionalencryptionrecipientcount)
(4) number of signed sections Based on the foregoing information, the Policy Management Agent may enforce specified crypto policies on the message, as shown at step 506. In an exemplary embodiment, policies or rules include:

(1) message must/must not/may be encrypted
(2) message must/must not/may be signed (mutually exclusive with previous)
(3) if encrypted, message must be encrypted to one of the following sets of keys (4) if encrypted, message must not be encrypted to any of the following keys (5) if encrypted, convention encryption may/may not be used The policies can be applied to certain groups/entities based on their network location (i.e. Internet Protocol or IP address).

As shown at step 507, if a policy violation occurs, the event is logged in a logfile, and the message is not forwarded to the "real" messaging gateway. A configurable message, which informs the user why his message was rejected, is returned to the user. Thereafter, the system may perform cleanup and await another client connection.

E. Source code implementation

The system's policy may be maintained in a configuration file which is loaded into a global policy structure, PGP-Policy. The structure may be defined as follows.

```
typedef struct PGPPolicy {
    /*
     * proxy-specific settings
     */
    char                *smtphost;
    unsigned short      smtpport;
    unsigned short      smtpproxyport;
    char                *pophost;
    unsigned short      popport;
    unsigned short      popproxyport;
    /*
     * policy-specific settings
     */
    PGPKEYID            **keyEncList;
    PGPKEYID            *keyForbidList;
    char                **checkIP;
    unsigned int        mustEncrypt;
    unsigned int        allowConventionalEncrypt;
    unsigned int        allowSigning;
    /*
     * error message-specific settings
     */
    char                *recoverErrorMessage;
    char                *encryptErrorMessage;
    char                *forbidErrorMessage;
    char                *signatureErrorMessage;
    char                *conventionalEncryptErrorMessage;
}
PGPPolicy;
```

The Agent waits for a client connection, passing recipient/protocol specific information to the "real" gateway (e.g., SMTP server).

When a message body ("BODY") is received, the system proceeds to process the new message using a ProcessNewMessage function or method, which may be implemented as follows (e.g., using the well-know C/C++ programming language).

```
// ================================================
/*
 * The proxy component calls this function, once the message body
 * has been received (i.e. the DATA state in the SMTP protocol
 * has completed)
 */
int
ProcessNewMessage(
PGPContextRef       context,        // sdk context
PGPSOCKETREF        pSocket,        // socket reference
PGPPolicy           *policy,        // policy from cfg file
uchar               *buffer,        // buffer containing entire message
ulong               buflen )        // length of buffer
```

-continued

```
{
PGPMessageContent content;
BOOL conventionalEncryptViolation = FALSE;
BOOL digitalSignatureViolation = FALSE;
BOOL forbiddenKeyViolation = FALSE;
PGPKEYID *keyForbidList = NULL;
PGPKEYID *keyEncList = NULL;
encKeyIdList *currentKeyIdBlock = NULL;
uchar **keyIdArray = NULL;
/* Initialize content */
// ... housekeeping code omitted for clarity of description
if (DecodePGPMessage( context,
// sdk context
                    pSocket,        // socket reference
                    buffer,         // buffer containing entire message
                    buflen,         // length of buffer
                    &content )      // structure to contain stats
{
    /*
     * cleanup log error, return
     */
    return CHECK_GENERAL_FAIL
}
/*
 * The begining of the "Analysis Engine"
 */
if( policy->allowConventionalEncrypt == FALSE &&
    content.conventionalKeyCount > 0)
{
    /*
     * Conventional encryption prohibited
     */
    conventionalEncryptViolation = TRUE;
    goto done;
}
if( ( ( policy->allowSigning == SIGN_REQUIRE ) &&
      ( content.signedSectionCount == 0 ) ) ||
    ( ( policy->allowSigning == SIGN_DISALLOW ) &&
      ( content.signedSectionCount > 0 ) ) )
{
    /*
     * signing violation
     */
    digitalSignatureViolation = TRUE;
    goto done;
}
/*
 * nothing further to check
 */
if( content.encryptionKeyCount == 0)
{
    goto done;
}
/*
 * check on keys
 */
currentKeyIdBlock = content.encryptionKeyIds;
/*
 * Enumerate through the keyids found for all of the
 * message blocks in this message, and look for any
 * that match the "forbidden keys"
 */
// ... housekeeping code omitted for clarity of description
/*
 * if we've already violated policy then just abort
 */
if( forbiddenKeyViolation == TRUE
{
    goto done;
}
currentKeyIdBlock = content.encryptionKeyIds;
/*
 * Enumerate through the keyids found for all of the
 * message blocks in this message, and ensure that
 * each block has been encrypted to at least 1 set of
 * the required recovery keys
 */
// ... housekeeping code omitted for clarity of description
if( recoveryCompliant == FALSE )
```

```
    {
    /*
     * we've failed on this buffer
     */
    break;
  }
done:
  /*
   * Free up the message keyids
   */
  currentKeyIdBlock = encKeyIdHead;
  while( currentKeyIdBlock != NULL )
  {
    keyIdArray = currentKeyIdBlock->keyids;
    if( keyIdArray )
    {
      for( i = 0; keyIdArray[i] != NULL; i++ )
      {
        if( keyIdArray[i] )
        {
          free( keyIdArray[i] );
        }
      }
      free ( keyIdArray );
      nextKeyIdBlock = currentKeyIdBlock->next;
      free ( currentKeyIdBlock );
      currentKeyIdBlock = nextKeyIdBlock;
  }
  (void) PGPFreeContext( context );
  PGPsdkCleanup ();
  if( digitalSignatureViolation == TRUE )
  {
    /*
     * Log error, return
     */
    return( CHECK_SIGN_FAIL );
  }
  /*
   * if there are no conventional recipients, and no encryption keys
   * then this message is not encrypted
   */
  if( ( content.conventionalKeyCount == 0 &&
        content.encryptionKeyCount == 0 ) &&
      ( policy->mustEncrypt == ENCRYPT_REQUIRE ) )
  {
    /*
     * Log error, return
     */
    return( CHECK_ENCRYPT_FAIL );
  }
  if( conventionalEncryptViolation == TRUE )
  {
    /*
     * Log error, return
     */
    return( CHECK_CONVENTIONAL_FAIL );
  }
  if( forbiddenKeyViolation == TRUE )
  {
    /*
     * Log error, return
     */
    return( CHECK_RECIPIENT_FAIL );
  }
  if( recoveryCompliant == FALSE &&
      policy->mustEncrypt == ENCRYPT_REQUIRE )
  {
    /*
     * Log error, return
     */
    return ( CHECK_RECOVERY_FAIL );
  }
  return ( CHECK_SUCCESS );
}
```

As shown, the Analysis Engine is invoked by calling DecodePGPMessage. This function may be constructed as follows.

```
/*
 * Decodes the buffer passed in, and returns a count of the interesting
 * pieces.
 */
int
DecodePGPMessage(
    PGPContextRef   context,        // sdk context
    PGPSOCKETREF    pSocket,        // socket reference
    uchar           *buffer,        // buffer containing entire message
    ulong           buflen,         // length of buffer
    PGPMessageContent *content )    // structure to contain stats
{
    PGPError            err;
    PGPAnalyzeContext   analyzeContext;
    PGPKeySetRef        keyset;
    PGPOptionListRef    opts = NULL;
    char                errorString[256];
    /*
     * Initialize the structure that will be passed to the callback function
     * from the sdk. This callback function will allow us to determine
     * exactly
     * what the sdk has determined in it's analysis of the buffer
     */
    analyzeContext.content                      = content;
    analyzeContext.encryptionkeyIdHead
        = content->encryptionKeyIds;
    analyzeContext.keyIdTail                    = NULL;
    analyzeContext.buffer                       = buffer;
    analyzeContext.sectionType
        = kPGPAnalyze_Encrypted;
    analyzeContext.header                       = FALSE;
    analyzeContext.startOffset
        = -1;
    analyzeContext.endOffset                    = 0;
    /*
     * create a new keyset, which is required for use by the sdk during
     * a call to PGPDecode
     */
    err = PGPNewKeySet (context, &keyset);
    if (IsPGPError (err))
    {
        /*
         * Log error, return
         */
        return -1;
    }
    /*
     * The buffer is passed to the sdk, along with an event handler,
     * which will cause the sdk to call the sdkCallback function upon
     * each new event encountered in the buffer
     * We are telling the sdk to pass through all data, and discard
     * the output, since we're not actually trying to decrypt the
     * message, just get a list of the recipient keyids, and other
     * relevant info.
     */
    err = PGPDecode( context,
            PGPOKeySetRef( context, keyset ),
            PGPOInputBuffer( context, buffer, buflen ),
            PGPOEventHandler( context, sdkCallback, &analyzeContext ),
            PGPOPassThroughIfUnrecognized( context, TRUE ),
            PGPODiscardOutput( context, TRUE ),
            PGPOLastOption( context ) );
    /*
     * Clean up the keyset
     */
    PGPFreeKeySet ( keyset );
    if( IsPGPError( err ) )
    {
        /*
         * cleanup, log error, return
         */
        return -1;
    }
    else
    {
        /*
         * The sdk was successful in processing this buffer,
         * Just verify that the last "section" does not contain cleartext
         * so we will look for the "\r\n.\r\n" in the message, which
```

-continued

```
 * indicates that we're done.
 */
 analyzeContext.endOffset = buflen - backFromDot;
 return 0;
 }
}
```

As shown, the function includes a call to PGP Decode, for passing the message BODY to the PGP SDK engine. In particular, the message BODY buffer is passed to the SDK, along with an event handler. This action will cause the SDK to call an sdkCallback function upon each new event encountered in the buffer. In effect, the call is telling the SDK to pass through all data, and discard the output, since the caller is not actually trying to decrypt the message but, instead, just getting a list of the recipient keyids, and other relevant info. The sdkCallback function may be implemented as follows.

```
/*
 * SDK Decoding callback, where we will react to the interesting events
 * which occur during PGPDecode
 */
PGPError
sdkCallback(
    PGPContextRef    context,
    PGPEvent    *event,
PGPUserValue    userValue)
{
    const PGPKeyID      *keyIDArray;
    PGPError            err = kPGPError_NoErr;
    PGPUInt32           count;
    PGPUInt32           i;
    PGPAnalyzeContext   *analyzeContext;
    encKeyIdList        **keyIdHead;
    encKeyIdList        *keyIdTail;
    char                keyIDBuffer[kPGPMaxKeyIDStringSize];
    switch( event->type )
    {
    /*
     * The kPGPEvent_RecipientsEvent type indicates that the sdk has
     * found one or more encryption recipients in the current buffer
     * segment
     */
    case kPGPEvent_RecipientsEvent:
        analyzeContext = ( PGPAnalyzeContext * ) userValue;
        count     = event->data.recipientsData.keyCount;
        /*
         * The list of keyids for each encryption block section is
         * stored in a super-list. We do this to ensure that all
         * encrypted blocks are policy compliant.
         * Add this keyids in this block to the tail of the "super-list"
         */
        // ... housekeeping code omitted for clarity of description
        /*
         * We will also increment the conventional encryption key
         * count.
         */
        analyzeContext->content.conventionalKeyCount +=
            event->data.recipientsData.conventionalPassphraseCount;
        keyIDArray = event->data.recipientsData.keyIDArray;
        /*
         * the keyIDArray contains the internal keyids. We will use
         * this information to retrieve human-readable, string versions
         * of the keyids, so we can match with the versions in the policy
         * policyuration file
         */
        // ... housekeeping code omitted for clarity
        analyzeContext->content.encryptionKeyCount += count;
        return kPGPError_NoErr;
        /*
         * The kPGPEvent_BeginLexEvent type indicates that the sdk has
         * found the start of a new section
         */
```

```
         */
    case kPGPEvent_BeginLexEvent:
        analyzeContext = ( PGPAnalyzeContext * ) userValue;
        if( analyzeContext->startOffset != -1 )
        {
        /*
         * we should now only be dealing with situations where there is
         * a previous buffer
         */
        analyzeContext->endOffset
            = event->data.beginLexData.sectionOffset;
        analyzeContext->startOffset = callBackData->endOffset;
        }
        else
        {
        analyzeContext->startOffset
            = event->data.beginLexData.sectionOffset;
        }
        break;
    /*
     * The kPGPEvent_AnalyzeEvent type indicates that the sdk has found
     * a parsable event. We're looking here for signed blocks.
     */
    case kPGPEvent_AnalyzeEvent:
        analyzeContext     = ( PGPAnalyzeContext * ) userValue;
        analyzeContext->type = event->data.analyzeData.sectionType;
        if( event->data.analyzeData.sectionType == kPGPAnalyze_Signed )
        {
            analyzeContext->content.signedSectionCount++;
        }
        break;
    }
    return kPGPError_NoErr;
}
```

The Response Component or Engine may now determine if the message is policy compliant. The program logic, which is shown above for the ProcessNewMessage API call, may be summarized by the following pseudo-code.
If >1 conventional encryption recipient
AND contention encryption is FORBIDDEN
Log conventional encryption violation
Reject error with appropriate message
550 You have conventionally encrypted this message. It is rejected
If digital signatures REQUIRED and signature count==0
Log signature violation
Reject error with appropriate message
550 You have not signed this message, and messages must be signed.
If digital signatures FORBIDDEN and signature count >0
Log signature violation
Reject error with appropriate message
550 You have signed this message, and you must not sign email.
If encryption is REQUIRED and the message is NOT encrypted
Log encryption violation
Reject error with appropriate message
550-You have sent this message in cleartext,
550-and all email must be encrypted.
550 The message has been rejected
If message is encrypted to a FORBIDDEN key
Log encryption violation
Reject error with appropriate message
550-You have encrypted this message to one or more forbidden
550 key. The message has been rejected.
If message is NOT encrypted to one of the sets of recovery keys Log encryption violation
Reject error with appropriate message
550-You have violated corporate policy with this message
550-You must also encrypt this message to the corporate key
550 The message has been REJECTED.
If message is policy compliant
Forward message body to "real" messaging gateway and continue transaction Now, the system may perform cleanup and await another client connection.

Also appended as Appendix C to the abovementioned provisional application 60/095,722 (the disclosure of which has been incorporated by reference) is user documentation entitled, Pretty Good Privacy™ Policy Management Agent For SMTP For UNIX/Windows NT, which provides further description of the present invention.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computer environment having a messaging service for transmitting messages created by clients having public key cryptographic support, a method for managing a crypto policy for messages submitted for transmission by the messaging service, the method comprising:

defining a crypto policy comprising a set of constraints specifying one or more conditions which messages submitted to the messaging service must satisfy before being accepted for transmission by the messaging service;

receiving a particular message from a client for transmission by the messaging service;

determining whether the particular message conforms to the crypto policy by applying said set of constraints to the message;

if the particular message satisfies said set of constraints, forwarding the particular message to the messaging service, so that the message may be transmitted to its intended recipient; and if the particular message does not satisfy said set of constraints, rejecting the particular message, so that the message is blocked from transmission by the messaging service.

2. The method of claim 1, wherein said messaging service comprises a messaging service compatible with Simple Mail Transport Protocol (SMTP).

3. The method of claim 1, wherein said set of constraints includes a constraint specifying whether a particular message must be encrypted, must not be encrypted, or may be encrypted.

4. The method of claim 1, wherein said set of constraints includes a constraint specifying whether a particular message must be encrypted using at least one designated recovery key.

5. The method of claim 1, wherein said set of constraints includes a constraint specifying whether a particular message may not be encrypted from certain sites.

6. The method of claim 1, wherein said set of constraints includes a constraint specifying whether a particular message must be digitally signed, must not be digitally signed, or may be digitally signed.

7. The method of claim 1, wherein said set of constraints includes a constraint specifying that if a particular message is encrypted, the message must be encrypted to one of a set of designated keys.

8. The method of claim 1, wherein said set of constraints includes a constraint specifying whether a particular message must be rejected if it has been encrypted with a particular key.

9. The method of claim 8, wherein said particular key is designated as a forbidden key.

10. The method of claim 1, wherein said set of constraints includes a constraint specifying whether conventional encryption is allowed.

11. The method of claim 1, wherein said set of constraints is specified by a configuration file.

12. The method of claim 11, wherein said configuration file is configurable only by a user having system administrator privileges.

13. The method of claim 1, further comprising:

generating an error message for a message that has been rejected.

14. The method of claim 1, wherein said set of constraints includes a constraint specifying that if a particular message is encrypted, the message must not be encrypted to any one of a set of designated keys.

15. The method of claim 11, wherein said crypto policy is applied to certain clients based on their network location.

16. The method of claim 15, wherein said network locations comprise Internet Protocol (IP) addresses.

17. The method of claim 1, further comprising:

logging an entry to a log file for indicating that a particular message has been rejected.

18. The method of claim 1, wherein said step of receiving a particular message comprises:

providing a proxy for effecting communications between clients and the messaging service.

19. The method of claim 18, wherein said step of receiving a particular message further comprises:

capturing the particular message's message body.

20. The method of claim 1, wherein said determining step comprises:

parsing the message body for gathering information about it.

21. A method for managing transmission of encrypted messages received at a mail server from a plurality of clients, the method comprising:

defining a set of constraints specifying one or more conditions which messages must satisfy before being accepted for transmission to intended recipients;

intercepting a request to transmit a particular message before the request is provided to the mail server;

automatically applying said set of constraints for determining whether the particular message should be passed to the mail server for transmission to intended recipient; and if the particular message satisfies said set of constraints, forwarding the particular message to the mail server so that the particular message may be transmitted to its intended recipients.

22. The method of claim 21, further comprising:

if the particular message does not satisfy said set of constraints, rejecting the message.

23. The method of claim 21, further comprising:

displaying an error message indicating why the message has been rejected.

24. The method of claim 21, wherein said mail server is compatible with Simple Mail Transport Protocol (SMTP).

25. The method of claim 21, wherein said set of constraints includes a constraint specifying whether a particular message must be encrypted, must not be encrypted, or may be encrypted.

26. The method of claim 21, wherein said set of constraints includes a constraint specifying whether a particular message must be encrypted using at least one designated recovery key.

27. The method of claim 21, wherein said set of constraints includes a constraint specifying whether a particular message may not be encrypted from certain sites.

28. The method of claim 21, wherein said set of constraints includes a constraint specifying whether a particular message must be digitally signed, must not be digitally signed, or may be digitally signed.

29. The method of claim 21, wherein said set of constraints includes a constraint specifying that if a particular message is encrypted, the message must be encrypted to one of a set of designated keys.

30. The method of claim 21, wherein said set of constraints includes a constraint specifying whether a particular message must be rejected if it has been encrypted with a particular key.

31. A system for managing transmission of encrypted messages received at a mail server from a plurality of clients, the system comprising:
   a configuration setting defining a policy specifying one or more conditions which message must satisfy before being accepted for transmission to intended recipients; and
   an agent, responsive to a request to transmit a particular message before the request is provided to the mail server, for forwarding the particular message to the mail server only if the particular message satisfies said policy.

32. The system of claim 31, wherein said agent rejects the particular message if the message does not satisfy said policy.

33. The system of claim 31, wherein said agent optionally returns an error message indicating why the message has been rejected.

34. The system of claim 31, wherein said policy includes a condition specifying whether a particular message must be encrypted, must not be encrypted, or may be encrypted.

35. The system of claim 31, wherein said policy includes a condition specifying whether a particular message must be encrypted using at least one designated recovery key.

36. The system of claim 31, wherein said policy includes a condition specifying whether a particular message may not be encrypted from certain sites.

37. The system of claim 31, wherein said policy includes a condition specifying whether a particular message must be digitally signed, must not be digitally signed, or may be digitally signed.

38. The system of claim 31, wherein said policy includes a condition specifying that if a particular message is encrypted, the message must be encrypted to one of a set of designated keys.

39. The system of claim 31, wherein said policy includes a condition specifying whether a particular message must be rejected if it has been encrypted with a particular key.

40. The system of claim 31, wherein said particular key is designated as a forbidden key.

* * * * *